US012137669B1

(12) United States Patent
Anderson

(10) Patent No.: US 12,137,669 B1
(45) Date of Patent: Nov. 12, 2024

(54) LIVESTOCK OILING APPARATUS WITH HIGHLY COMPACT CONFIGURATION

(71) Applicant: Lyle Anderson, Whitehorse, SD (US)

(72) Inventor: Lyle Anderson, Whitehorse, SD (US)

( * ) Notice: Subject to any disclaimer, the term of this patent is extended or adjusted under 35 U.S.C. 154(b) by 34 days.

(21) Appl. No.: 18/099,409

(22) Filed: Jan. 20, 2023

(51) Int. Cl.
*A01K 13/00* (2006.01)
*F16M 11/04* (2006.01)
*F16M 11/22* (2006.01)

(52) U.S. Cl.
CPC .......... *A01K 13/003* (2013.01); *F16M 11/046* (2013.01); *F16M 11/22* (2013.01); *F16M 2200/024* (2013.01)

(58) Field of Classification Search
CPC ...... A01K 13/003; E04H 15/46; E04H 15/48; E04H 15/44; E04H 15/60; F16M 11/046; F16M 11/22; F16M 2200/024
See application file for complete search history.

(56) References Cited

U.S. PATENT DOCUMENTS

| | | | | |
|---|---|---|---|---|
| 1,710,314 | A * | 4/1929 | Kyle | A01K 13/004 |
| | | | | 119/660 |
| 4,091,767 | A * | 5/1978 | Montgomery | A01K 13/003 |
| | | | | 119/652 |
| 4,671,479 | A * | 6/1987 | Johnson | F16M 11/242 |
| | | | | 248/188.7 |
| 5,255,633 | A | 10/1993 | Laurenz | |
| 6,007,032 | A * | 12/1999 | Kuo | F16M 11/16 |
| | | | | 248/188.7 |
| 6,766,623 | B1 * | 7/2004 | Kalnay | E04B 1/3441 |
| | | | | 135/147 |
| D643,230 | S * | 8/2011 | Hepeng | D6/708.25 |
| D687,421 | S * | 8/2013 | Slaton | D14/229 |
| D916,173 | S * | 4/2021 | Zeng | D16/244 |
| D962,329 | S * | 8/2022 | Feng | D16/244 |
| 11,940,717 | B1 * | 3/2024 | Zou | G03B 17/56 |
| 2015/0289480 | A1 | 10/2015 | Maag | |

OTHER PUBLICATIONS

Prairie Phoenix, "Helping you do a better job for less money", 4 pages, web page www.prairie-phoenix.com/, download date Jan. 19, 2023.

(Continued)

*Primary Examiner* — Yvonne R Abbott-Lewis
(74) *Attorney, Agent, or Firm* — Jeffrey A. Proehl; Woods, Fuller, Shultz & Smith, PC

(57) ABSTRACT

A support apparatus for supporting a substance receptive element may have a central axis extending between a top and a bottom of the apparatus, and may include a central base, an upstanding stanchion mounted on the central base and extending toward the top; and a plurality of legs mounted on the base. Each leg is movable between a collapsed position and an expanded position with respect to the base. The collapsed position may correspond to a transport condition of the apparatus and the expanded position may correspond to a deployed condition of the apparatus. The base may include a plurality of mounting structures with each mounting structure being associated with a leg for mounting the leg to the base. The mounting structures may secure the legs to the base in the collapsed position of the transport condition and the expanded position of the deployed condition.

20 Claims, 12 Drawing Sheets

(56) References Cited

OTHER PUBLICATIONS

Prairie Phoenix, "Prairie Phoenix Cattle Care System", 12 pages, web page www.prairie-phoenix.com/shop/prairie-phoenx-cattle-care-station/, download date Jan. 19, 2023.

Prairie Phoenix, "About Us", 4 pages, web page www.prairie-phoenix.com/about-us/, download date Jan. 19, 2023.

\* cited by examiner

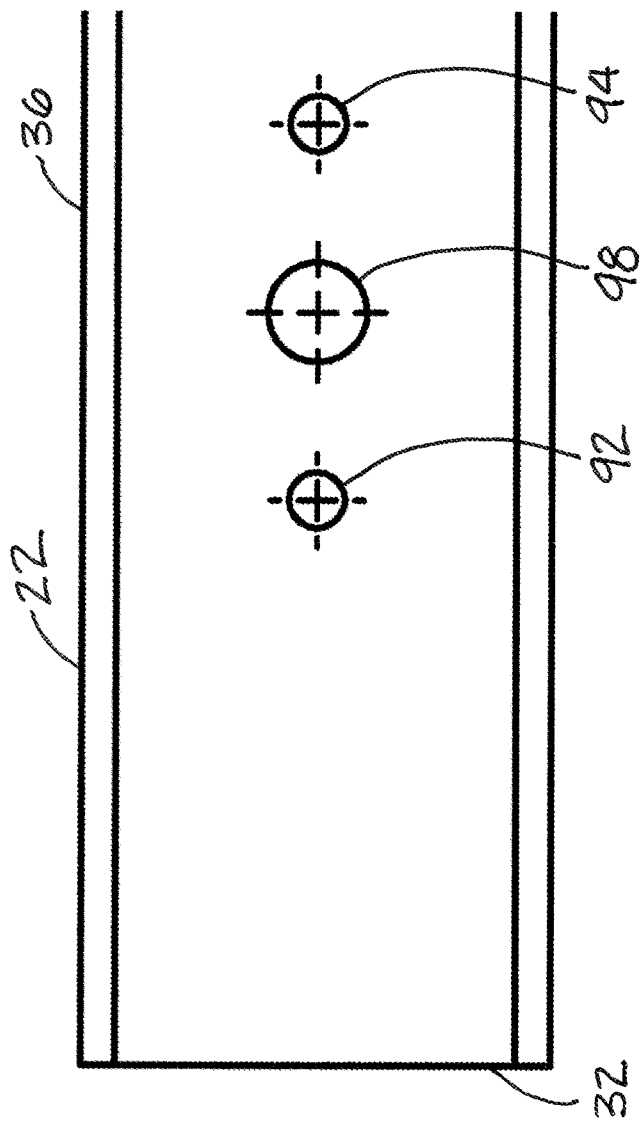

LIVESTOCK OILING APPARATUS WITH HIGHLY COMPACT CONFIGURATION

BACKGROUND

Field

The present disclosure relates to livestock oiling apparatus and more particularly pertains to a new livestock oiling system with a support apparatus with a highly compact configuration for transporting the apparatus between locations.

SUMMARY

In one aspect, the present disclosure relates to a support apparatus for supporting a substance receptive element to transfer a substance to a surface of a body of the livestock animal. The support apparatus may have a central axis extending between a top and a bottom of the apparatus. The apparatus may comprise a central base toward the bottom of the apparatus, an upstanding stanchion mounted on the central base and being elongated along the central axis to extend toward the top of the apparatus, and a plurality of legs mounted on the base with each leg being elongated with an inboard end and an outboard end. Each of the legs may be movable between a collapsed position with respect to the central base and an expanded position with respect to the central base. The collapsed position may correspond to a transport condition of the support apparatus and the expanded position may correspond to a deployed condition of the support apparatus. The central base may include a plurality of mounting structures with a said mounting structure being associated with each of the legs for mounting said leg to the base. The mounting structures may secure the legs to the central base in the collapsed position of the transport condition and the expanded position of the deployed condition.

In another aspect, the disclosure relates to a system for facilitating application of a substance to a surface of a body of a livestock animal. The system may comprise a substance receptive element configured to be moistened by the substance and configured to transfer a quantity of the substance to the surface of the body of the livestock animal when the surface comes into contact with the receptive element. The receptive element may be elongate with opposite ends. The system may further comprise a support apparatus supporting the substance receptive element, with the opposite ends of the receptive element being removably secured to the support apparatus at spaced locations on the apparatus. The support apparatus may have a central axis extending between a top and a bottom of the apparatus. The apparatus may comprise a central base toward the bottom of the apparatus, an upstanding stanchion mounted on the central base and being elongated along the central axis to extend toward the top of the apparatus, and a plurality of legs mounted on the base with each leg being elongated with an inboard end and an outboard end. Each of the legs may be movable between a collapsed position with respect to the central base and an expanded position with respect to the central base. The collapsed position may correspond to a transport condition of the support apparatus and the expanded position may correspond to a deployed condition of the support apparatus. The central base may include a plurality of mounting structures with a said mounting structure being associated with each of the legs for mounting said leg to the base. The mounting structures may secure the legs to the central base in the collapsed position of the transport condition and the expanded position of the deployed condition.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 12 is a schematic bottom view of the outboard end portion of one of the legs on which the towing component is mounted, according to an illustrative embodiment.

DETAILED DESCRIPTION

Figure 1:
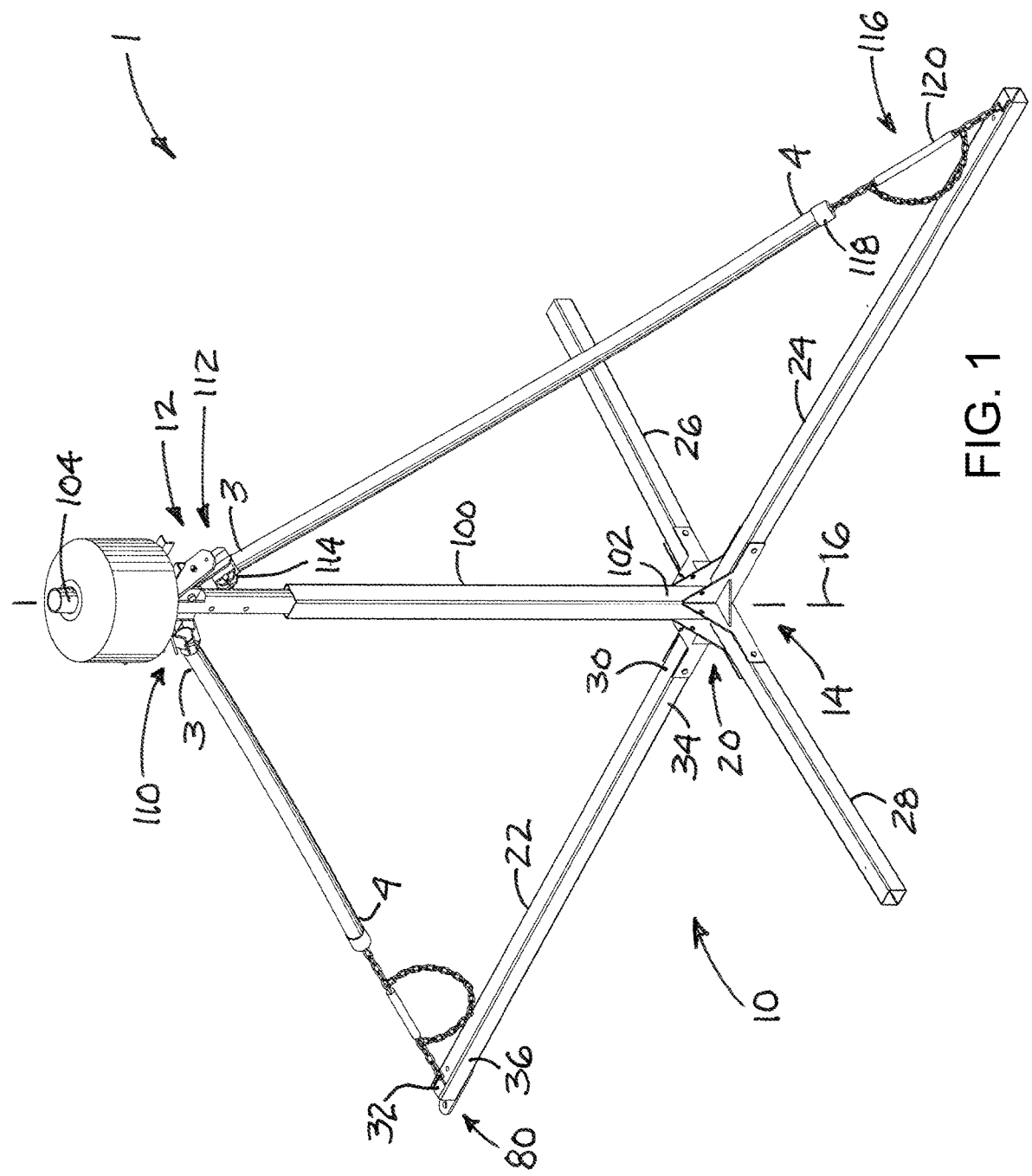
FIG. 1 is a schematic perspective view of a new livestock oiling system with a highly compact support apparatus according to the present disclosure.
Figure 2:
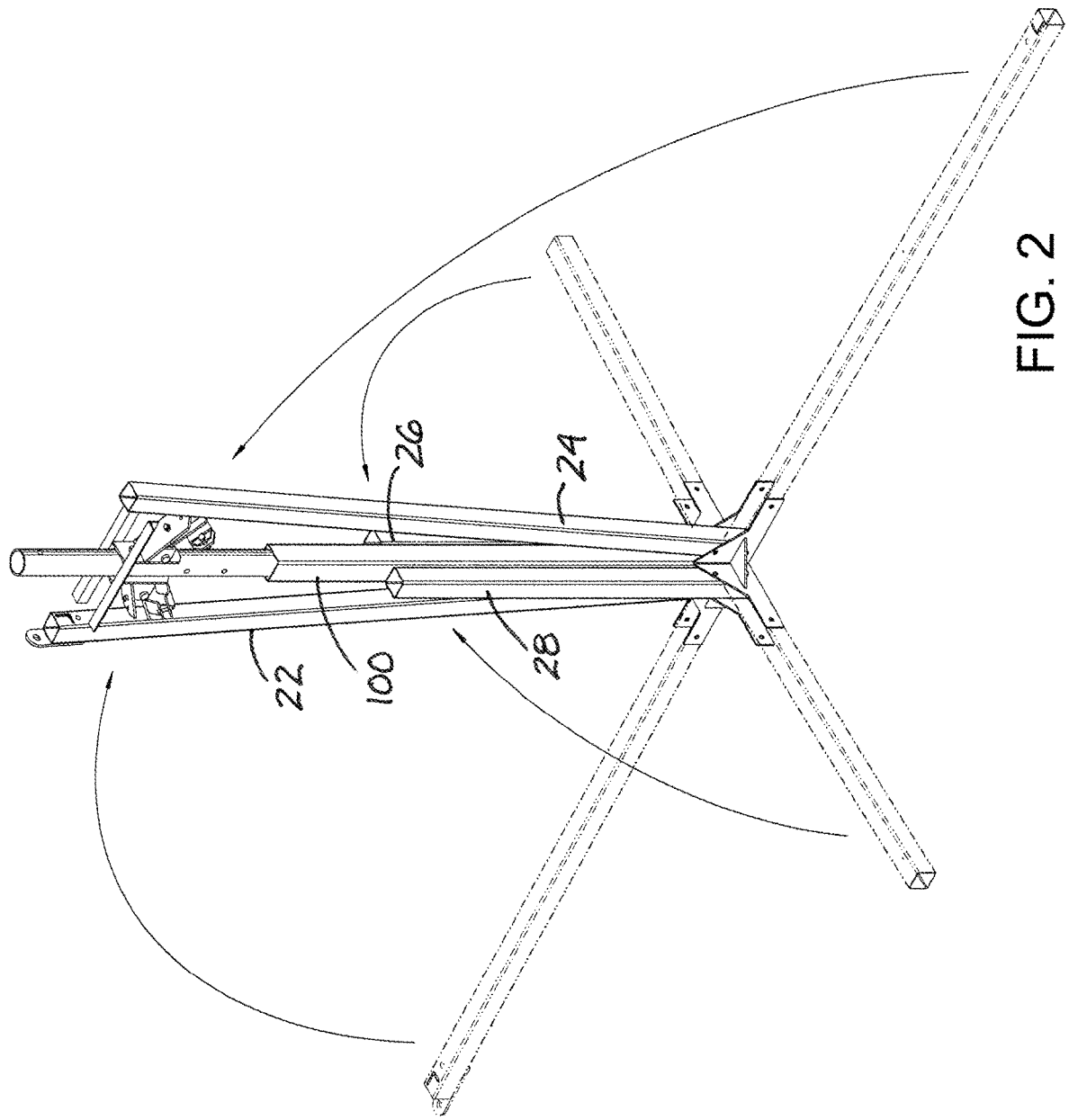
FIG. 2 is a schematic perspective view of the support apparatus with the legs shown in the collapsed positions of the transport condition of the apparatus, and the legs shown in the expanded positions of the point condition in broken lines, according to an illustrative embodiment.
Figure 3:
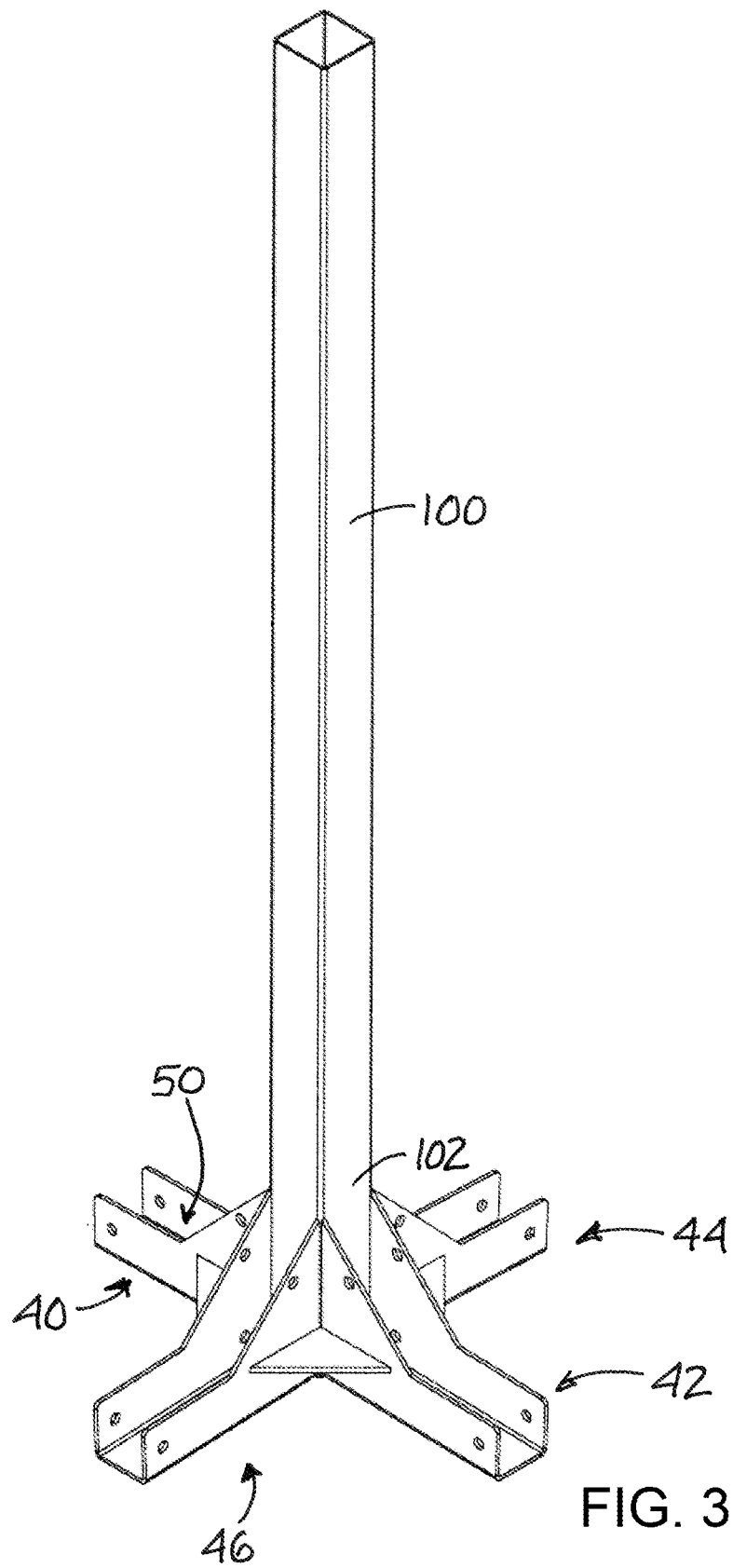
FIG. 3 is a schematic perspective view of the mounting structure and the stanchion of the support apparatus, according to an illustrative embodiment.
Figure 4:
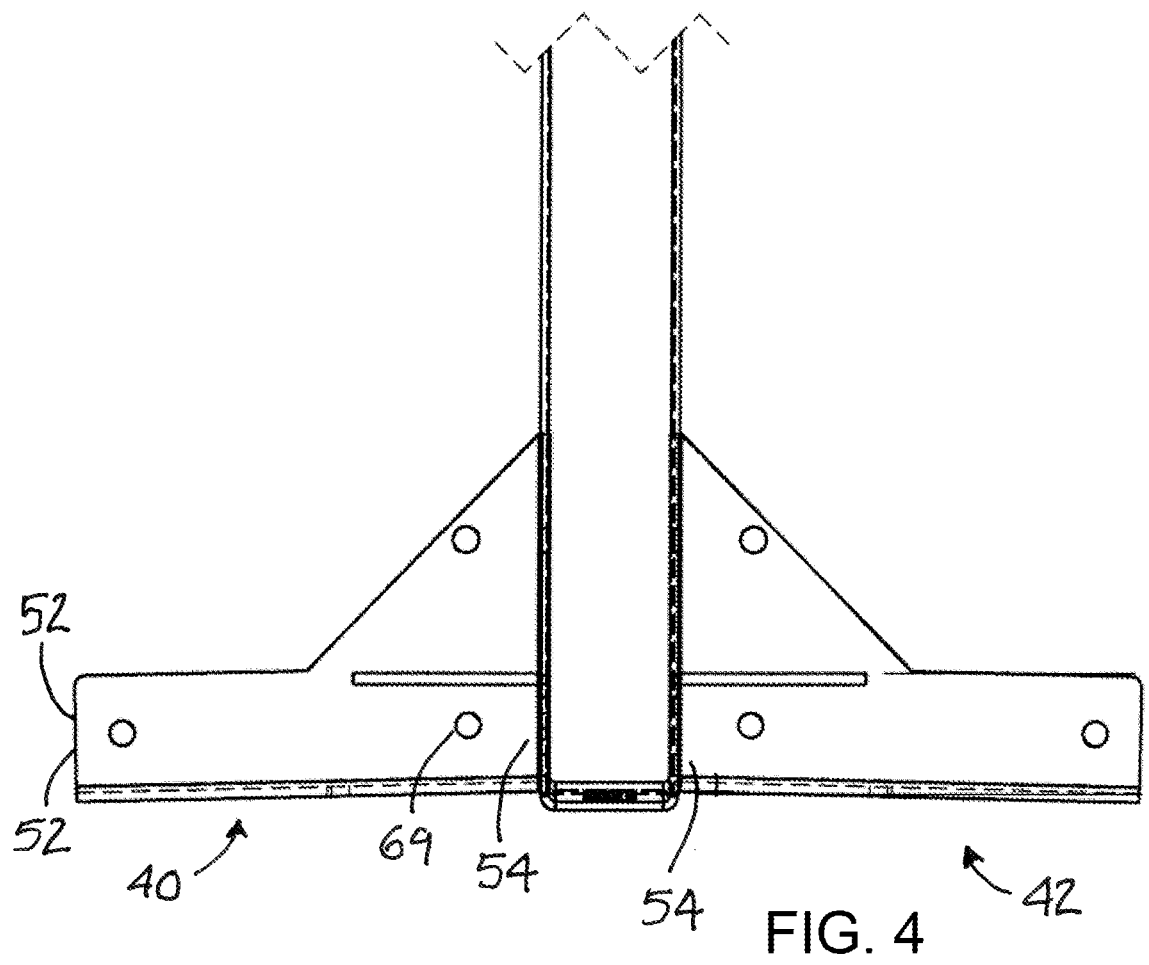
FIG. 4 is a schematic side sectional view of the mounting structure and the stanchion of the support apparatus, according to an illustrative embodiment.
Figure 5:
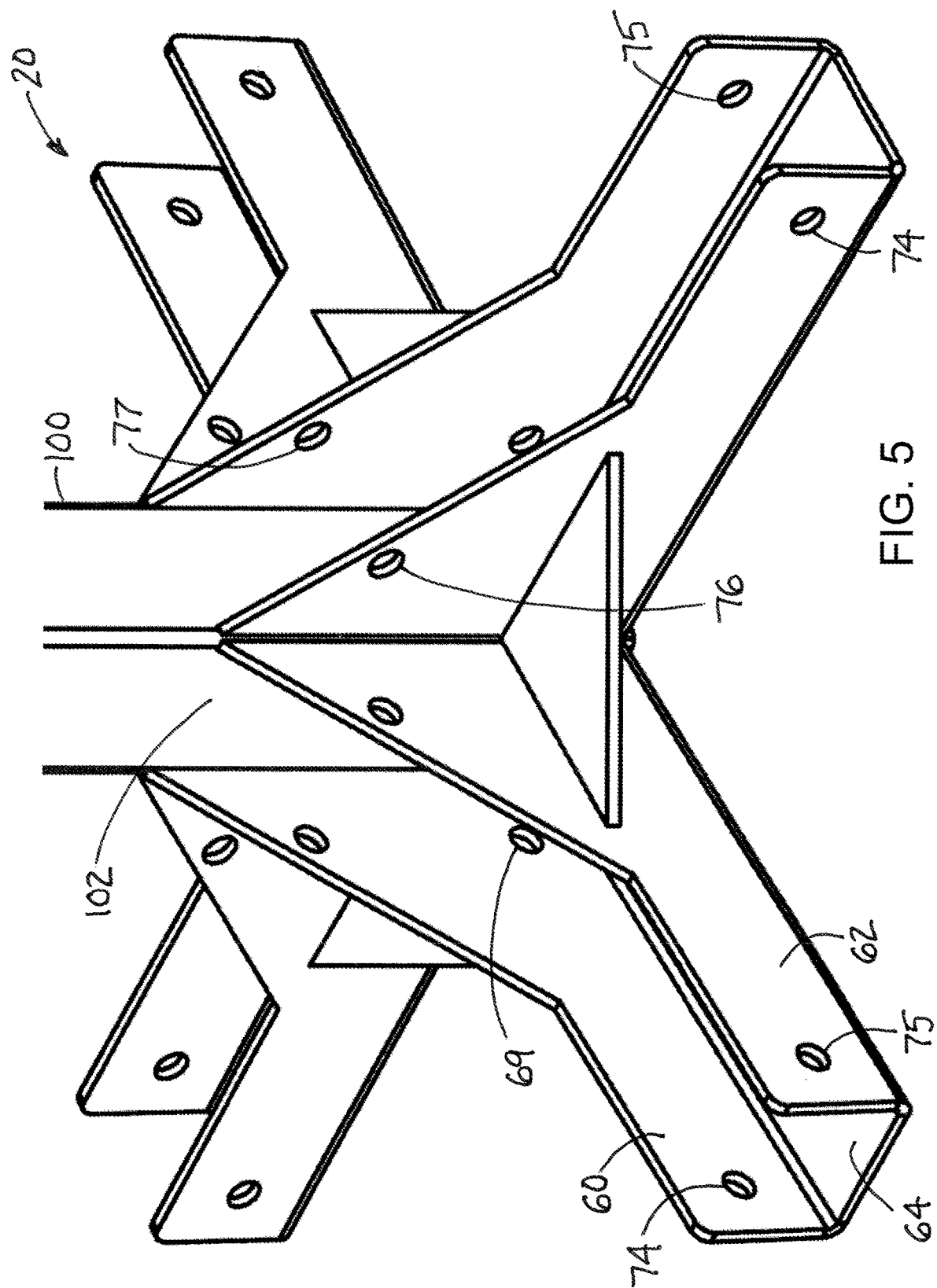
FIG. 5 is a schematic perspective view of the mounting structures of the central base, according to an illustrative embodiment.
Figure 6:
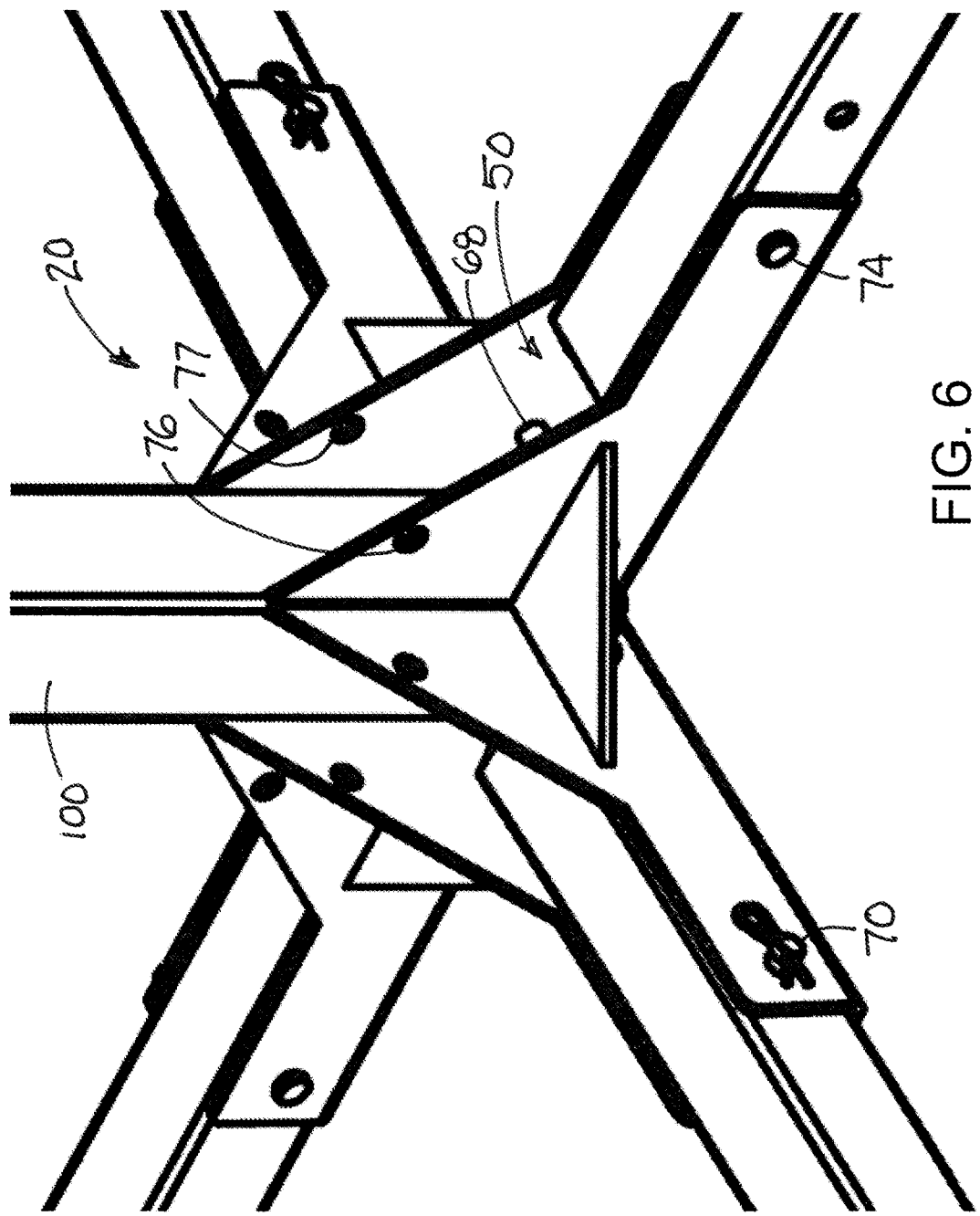
FIG. 6 is a schematic perspective view of the mounting structures of the central base and showing portions of the legs mounted thereon in the expended position, according to an illustrative embodiment.
Figure 7:
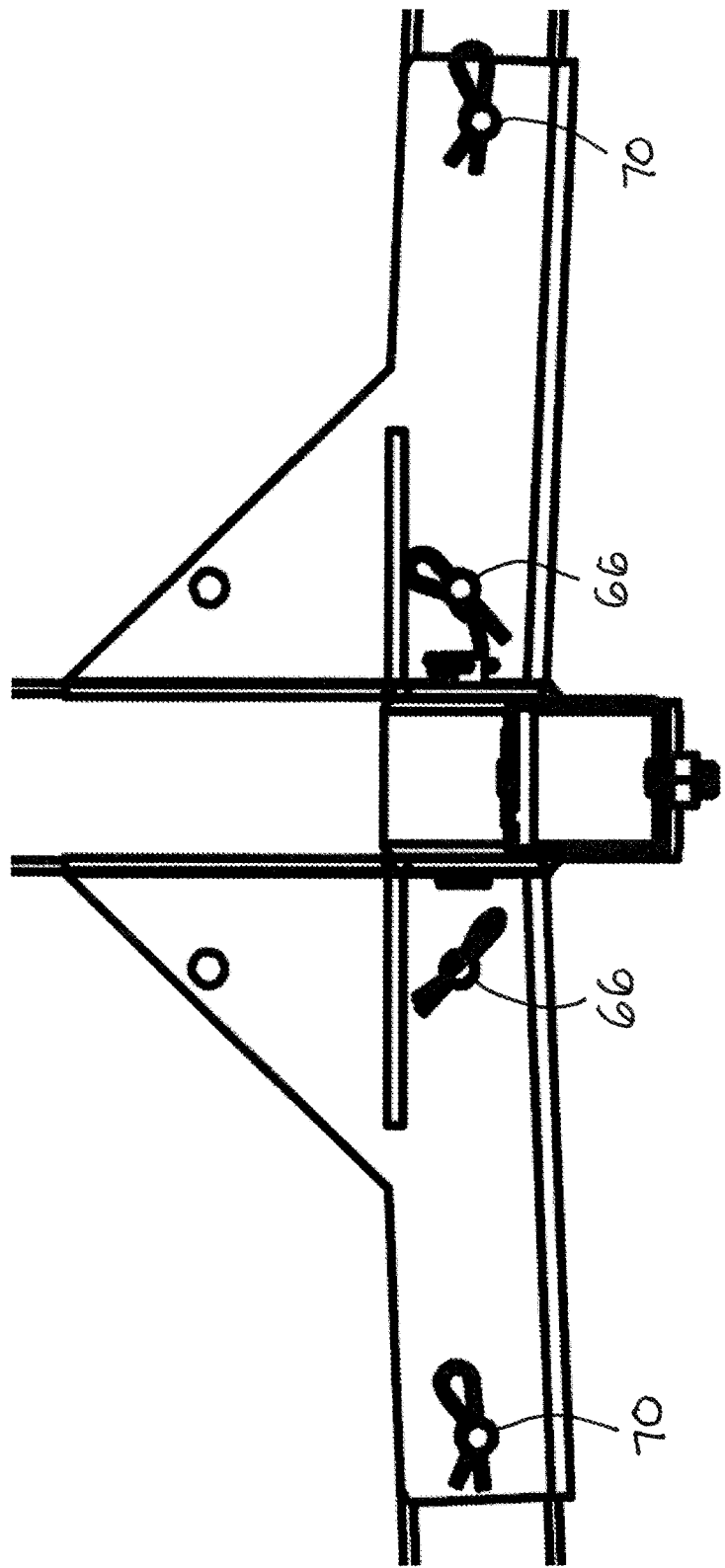
FIG. 7 is a schematic side view of the central base and portions of the legs, according to an illustrative embodiment.
Figure 8:
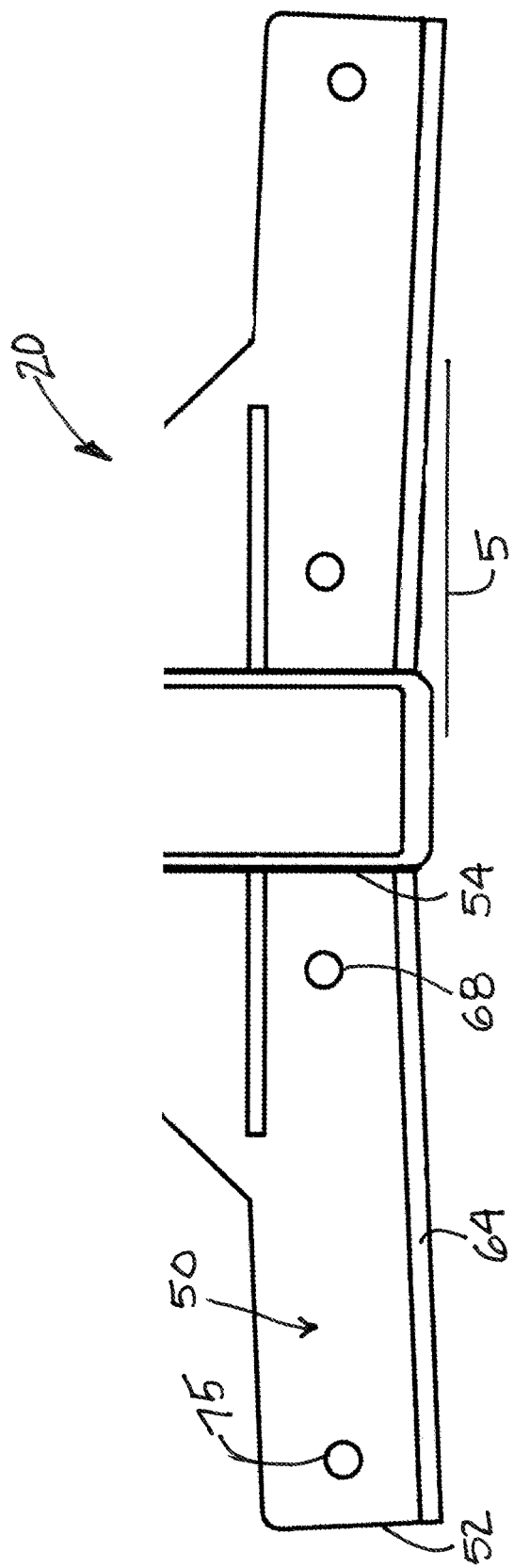
FIG. 8 is a schematic side view of the central base, according to an illustrative embodiment.
Figure 9:
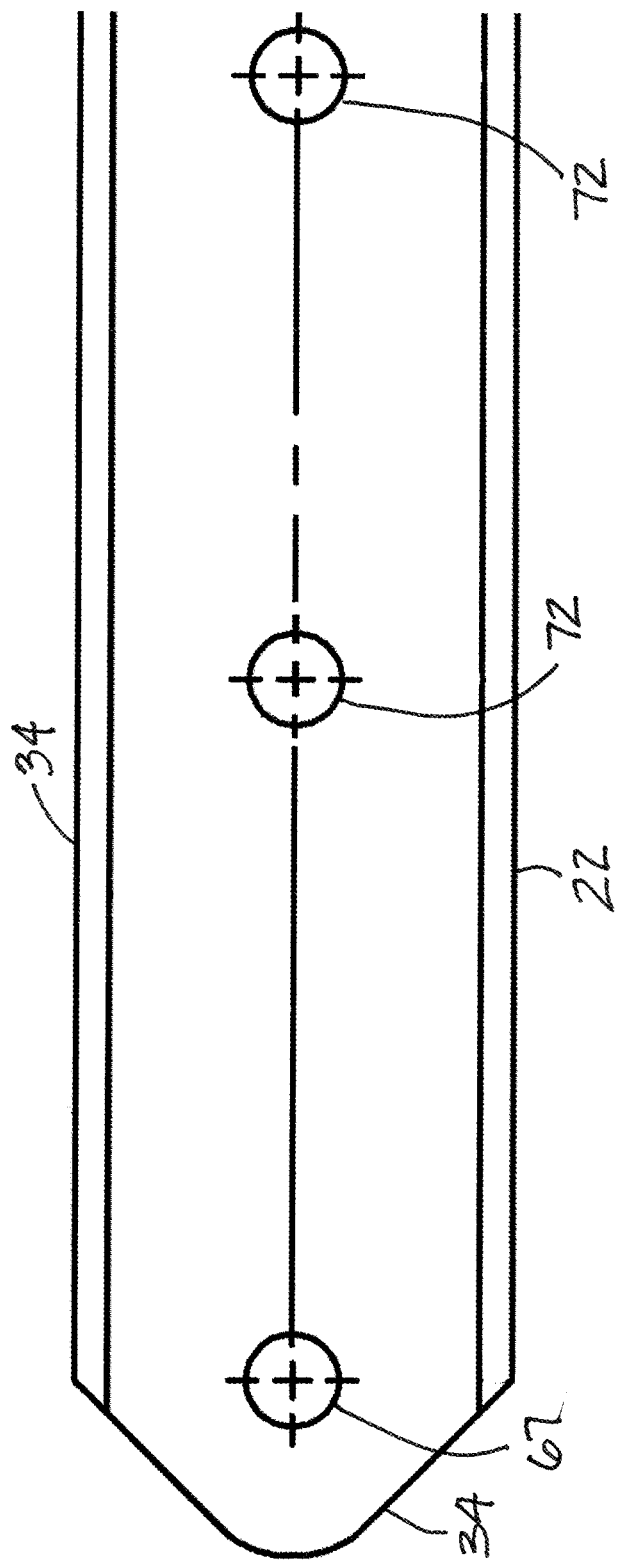
FIG. 9 is a schematic side view of the inboard end portion of one of the legs, according to an illustrative embodiment.
Figure 10:
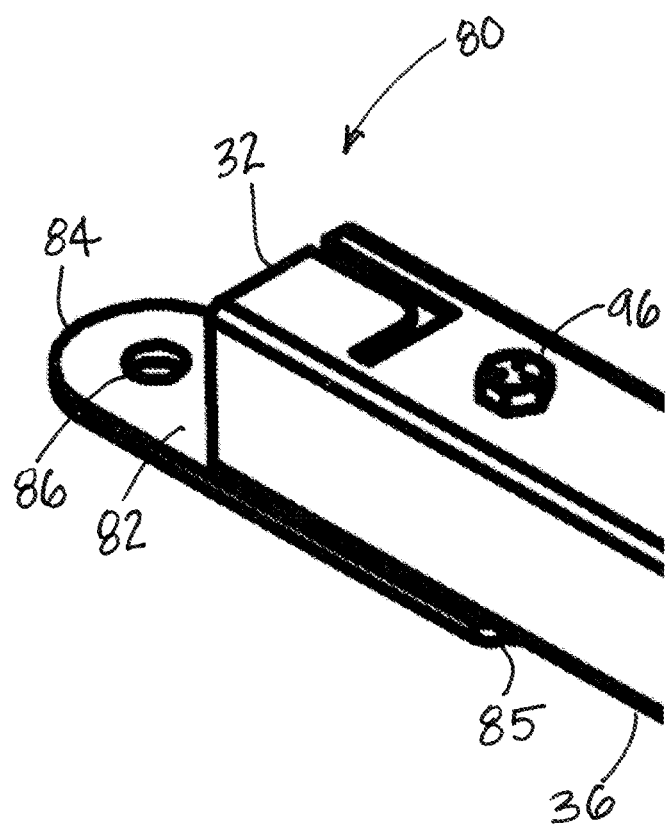
FIG. 10 is a schematic perspective view of the outboard end portion of the leg showing the towing component in the extended position, according to an illustrative embodiment.
Figure 11:
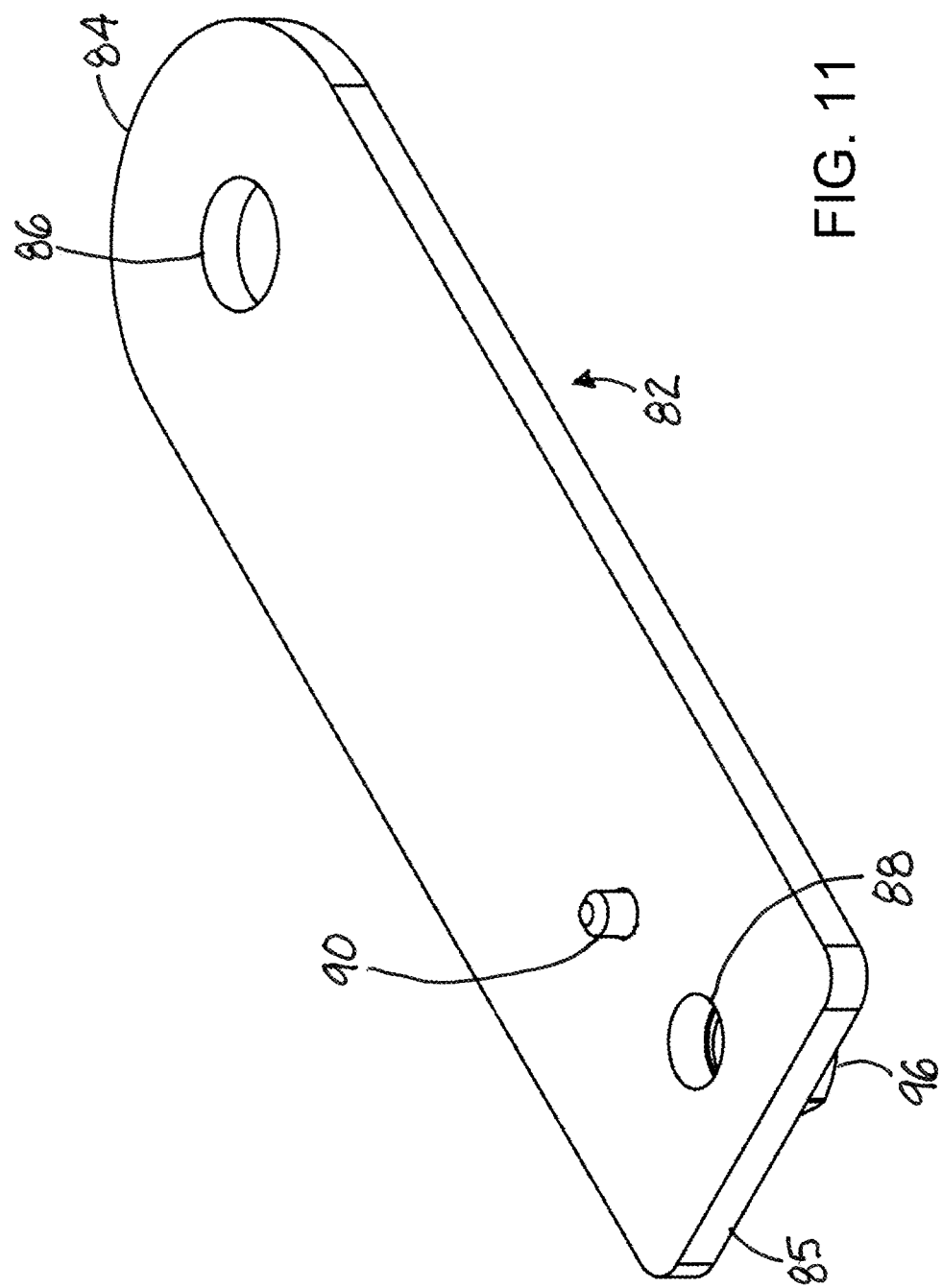
FIG. 11 is a schematic perspective view of the towing plate and detent of the towing component, according to an illustrative embodiment.

With reference now to the drawings, and in particular to FIGS. 1 through 12 thereof, a new livestock oiling system with a highly compact support apparatus which embodies the principles and concepts of the disclosed subject matter will be described.

Livestock "oiling" systems, or systems that permit a livestock animal to essentially self apply a beneficial substance (such as an insecticide) to its body, are known. U.S. Pat. No. 5,255,633 of Frank P Laurenz is one example of a highly useful oiling system, and is hereby incorporated by reference in this disclosure in its entirety.

Despite the usefulness of such systems in the agricultural field where livestock animals are grazing, the applicant has recognized drawbacks in some of the designs of the supporting apparatus utilized in such oiling systems. For example, the applicant has recognized that the rugged construction necessarily utilized for the supporting apparatus to resist the rigors of large livestock animals jostling against the elements of the system can make the apparatus unwieldy and bulky to transport, particularly in the initial shipment of the system including support apparatus from the manufacturer to the ultimate user of the system, and especially the field of the user where the livestock animals graze.

To solve this problem, the applicant has designed an oiling system, and in particular a support apparatus of the system, that has a highly compact configuration that facilitates shipping or transport of the support apparatus and as a result may greatly reduce the costs of moving the apparatus from the manufacturer to the field of the ultimate user. Aspects of the applicant's disclosure provide this benefit without compromising the strength or durability of the apparatus in the agricultural field when used by livestock animals.

In one aspect, the disclosure relates to a system 1 for facilitating application of a substance to a livestock animal, such as via self-application by the livestock through contact with an element to transfer the substance from the element to a surface of the body of the animal. The substance may have a flowable character, and may include an insecticide, and may have an oily character.

In embodiments of the disclosure, the system 1 may include a substance receptive element 2 which is configured to be moistened with the substance and is configured to transfer a quantity of the substance to the surface of the body of the livestock animal when the body surface comes into contact with the receptive element 2. The receptive element 2 may be elongate in shape with opposite ends 3, 4. Illustratively, the element 2 may comprise an elongate member suitable to conduct or transfer the substance along the length of the member, such as under the influence of gravity. illustratively, the receptive element 2 may comprise, for example, a length of a rope formed of intertwined fibers capable of conducting the substance, but other materials or constructions capable of performing this functionality may be utilized. A highly suitable assembly for providing the substance to the receptive element 2 is disclosed in the Laurenz patent (U.S. Pat. No. 5,255,633) incorporated herein, and will not be further described.

In embodiments, the system 1 may include a support apparatus 10 for supporting the substance receptive element 2. The support apparatus 10 may be configured to support the substance receptive element 2 in a manner that facilitates contact between the receptive element and the body surface of the livestock animal. The support apparatus 10 is typically employed to rest upon the ground surface 5 and support the substance receptive element 2 in a suspended manner between two spaced points or locations on the support apparatus above the surface 5. In general, the support apparatus 10 has a top 12 and a bottom 14, and a central axis 16 which extends between the top and bottom and which is substantially vertically oriented when the apparatus is situated for use. A width measurement or dimension of the support apparatus 10 may be measured in a direction perpendicular to the central axis 16.

The support apparatus 10 may be characterized by having a transport condition which may be a configuration of the apparatus 10 that is relatively more suitable for shipping the apparatus 10 over long distances, such as when the apparatus is being transported from the manufacturer or seller to the ultimate customer. The support apparatus 10 may also be characterized by a deployed condition which may be a configuration of the apparatus that is the configuration most suitable for the apparatus to have for supporting the substance receptive element 2. The transport condition may be characterized by the width measurement of the apparatus 10 being smaller than the width measurement of the apparatus in the deployed condition.

In greater detail, the illustrative embodiments of the support apparatus 10 may comprise a central base 20 and a plurality of legs 22 mounted on the base. Illustratively, the plurality of legs 22, 24, 26, and 28 may include four legs, although more or fewer legs may be utilized. For the purposes of this description, the leg 22 will be described with the understanding that the legs 24, 26, and 28 may have the same configuration unless specifically noted.

The leg 22 may be characterized by being elongated in shape and having an inboard end 30 and an outboard end 32 relative to the central axis 16. Each leg 22 may have an inboard end portion 34 toward the inboard end 30 and an outboard end portion 36 toward the outboard end 32. Each leg 22 has a length between the inboard 30 and outboard 32 ends. In some embodiments, a first pair 22, 24 of the legs may have a first length and a second pair 26, 28 of the legs may have a second length, and the first length is longer than the second length. As an illustrative example, the length of the legs are such that the distance between the outboard ends of the first pair of legs is approximately 170 inches, and the distance between the outboard ends of the second pair of legs is approximately 100 inches.

Each leg 22 is movably mounted on the central base 20, and may be movable between a collapsed position with respect to the base and an expanded position with respect to the base. In embodiments, the collapsed position of the leg may correspond to the transport condition of the support apparatus, and the expanded position of the leg may correspond to the deployed condition of the apparatus 10. The collapsed position of the leg may be further characterized by the leg extending substantially parallel to the central axis 16 of the apparatus 10, and the expanded position may further be characterized by the leg extending substantially perpendicular to the central axis. The plurality of legs 22, 24, 26, and 28 may radiate outwardly with respect to the central axis 16 in the expanded position, and the expanded position may also be characterized by each of the legs extending substantially perpendicular to a pair of the legs and parallel to another one of the legs.

In the illustrative embodiments, the central base 20 has a mounting structure 40 associated with each of the legs for mounting the corresponding or respective leg to the base 20. The mounting structures 40 may secure the legs 22 to the base 20 in the expanded position of the deployed condition and also in the collapsed position of the transport condition. The central base 20 may thus have a plurality of the mounting structures 40, 42, 44, and 46 which are configured to support the legs 22 in substantially perpendicular orientations when the legs are each in the expanded positions. For the purposes of this description, the mounting structure 40 will be described with the understanding that structures 42, 44, and 46 may have the same configuration unless specifically noted.

In some embodiments, the mounting structures 40 may be configured to support the legs 22 along individual axes that deviate from a perpendicular orientation to the central axis in the expanded position to effectively raise the base 20 above a ground surface when the legs 22 are in the expanded position, such that the support apparatus 10 tends to rest upon the ground surface at the outboard end portions of the legs rather than the base 20.

For example, the orientations of the mounting structures 40 may be configured such that the axes of the legs deviate approximately 1.5 degrees from the perpendicular to the central axis, such that the axis of a leg is oriented approximately 91.5 degrees from the section of the central axis above the leg (e.g., toward the top 12) and approximately 88.5 degrees from the section of the central axis below the leg (e.g., toward the bottom 14. As another example, the orientations of the mounting structures 40 may be configured such that the axes of the legs deviate approximately 5 degrees from the perpendicular to the central axis, such that the axis of a leg is oriented approximately 92.5 degrees from the section of the central axis above the leg (e.g., toward the top 12) and approximately 87.5 degrees from the section of the central axis below the leg (e.g., toward the bottom 14. It will be recognized that variations in the length of the respective legs may necessitate different angular deviations depending upon, for example, the relationship between the lengths.

In illustrative embodiments, the mounting structure 40 may define a channel 50 for receiving a portion of the respective leg 20, such as the inboard end portion 34. The extent of the inboard end portion 34 that is received by the channel 50 may be greater in the expanded position of the leg than the extent that is received in the channel in the collapsed position. In greater detail, the channel 50 may have an outer end 52 away from the central axis 16, and the outer end may be open to permit the leg 22 to extend through the open outer end of the channel when the leg is in the expanded position. The channel 50 may also have an inner end 54 located closer to the central axis 16, and the inner end may be closed. The channel 50 may also have an open upper slot 56 opening upwardly toward the top 12 of the support apparatus, and the slot 56 may extend from the outer end 52 to the inner end 54 of the channel. The leg 22 may extend through the open upper slot 56 when the leg 22 is in the collapsed position. The channel 50 may be formed by a pair of opposed side walls 60, 62 and a bottom wall 64 extending between the pair of side walls.

The inboard end 30 of the leg 22 may be movably mounted on the mounting structure 50 of the base, and in embodiments, the end 30 is pivotally mounted on the structure 50. Illustratively, a pivot pin 66 may pivotally mount the inboard end portion 34 of the leg 22 to the side walls 60, 62 of the mounting structure. The pivot pin 66 may extend through a pivot aperture 67 in the leg 22 and through pivot holes 68, 69 formed in the side walls of the channel.

The mounting structure 50 may be configured to releasably secure the leg 22 in the expanded position, and may also releasably secure the leg in the collapsed position. Illustratively, the structure 50 may include a securing pin 70 for removably securing the leg in the expanded position, and the pin 70 may also removably secure the leg in the collapsed position. The securing pin 70 may be removably insertable through a securing aperture 72 in the leg and through securing holes in the side walls of the channel of the mounting structure. A first set 74, 75 of the securing holes may be alignable with the securing aperture 72 in the leg when the leg is in the expanded position, and a second set 76, 77 of the securing holes may be alignable with the securing aperture in the leg when the leg is in the collapsed position.

The support apparatus 10 may also include a towing component 80 mounted on one of the legs 22, and may be located on the outboard end portion 36 of the leg. The towing component 80 may be movably mounted on the leg such that the component is movable between an extended position and a retracted position. Illustratively, the towing component 80 may be rotatably mounted on the leg so that the towing component rotates between the extended and retracted positions.

In an illustrative embodiment, the towing component 80 includes a towing plate 82 which may be elongated in shape with a first end 84 and a second end 85. The towing plate 82 may have a towing aperture 86 that is located toward the first end 84 and may have a mounting hole 88 that is located toward the second end 85. The towing component 80 may further comprise a detent 90 on the towing plate 82 that is alignable with a first indentation 92 in the leg 22 when the leg is in the extended position, and is alignable with a second indentation 94 in the leg when the leg is in the retracted position. Each of the indentations 92, 94 may comprise a hole formed in the leg. The towing component 80 may further include a fastener 96 that extends through a mounting aperture 98 in the leg 22 and the mounting hole 88 of the towing plate to rotatably secure the towing plate to the leg.

The support apparatus 10 may further include an upstanding stanchion 100 mounted on the central base 20. The stanchion 100 is elongated along the central axis 16 of the apparatus 10, and extends upwardly toward the top 12 from the base. The stanchion 100 has a lower end 102 mounted on the base 20 and an upper end 104 opposite of the lower end 102. Optionally, the stanchion 100 may be selectively extendable and retractable to adjust the distance between the lower 102 and upper 104 ends.

The support apparatus 10 also includes a receptive element securing structure 110 for securing the receptive element 2 to the support apparatus 10, such as to the stanchion 100 and one of the legs 22. In some of the most preferred embodiments, a securing structure 110 is provided on opposite sides of the stanchion 100, such as at locations generally corresponding to the first pair 22, 24 of the legs. An upper portion 112 of the securing structure 110 may secure the uppermost end 3 to the stanchion 100 for securing the receptive element 2 to the stanchion. The upper portion 112 may be located toward the upper end 104 of the stanchion such that the receptive element 2 may be suspended by the upper portion 112 over the respective leg. Illustratively, the upper portion 112 of the structure may include an upper clamping member 114 which is configured to clamp onto the uppermost end 3 of the receptive element, and the upper clamping member may be movable or pivotable with respect to the stanchion 100 to facilitate a degree of movement of the element 2 with respect to the stanchion. A lower portion 116 of the securing structure 110 may secure the lowermost end 4 of the suspended receptive element to one of the legs 22 and may be secured to the respective leg at a location toward the outboard end 32 of the leg such that the suspended element 2 extends downwardly and outwardly with respect to the stanchion 100. Illustratively, the lower portion 116 may include a lower clamping member 118 which is configured to clamp onto the lowermost end of the element 2. Optionally, the lower portion 116 may include a tension element, such as a spring member 120, which permits a degree of movement of the receptive element under tension when the body of the livestock animal comes into contact with the element 2. Additional members, such as linking chains, may be utilized in combination with, or in place of, the spring member 120.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A support apparatus for supporting a substance receptive element to transfer a substance to a surface of a body of the livestock animal, the support apparatus having a central axis extending between a top and a bottom of the apparatus, the apparatus comprising:
    a central base toward the bottom of the apparatus;
    an upstanding stanchion mounted on the central base and being elongated along the central axis to extend toward the top of the apparatus;
    a plurality of legs mounted on the base, each leg being elongated with an inboard end and an outboard end; and
    a receptive element securing structure on the stanchion for securing the receptive element to the stanchion;
    wherein each of the legs is movable between a collapsed position with respect to the central base and an expanded position with respect to the central base, the collapsed position corresponding to a transport condition of the support apparatus and the expanded position corresponding to a deployed condition of the support apparatus; and
    wherein the central base includes a plurality of mounting structures with a said mounting structure being associated with each of the legs for mounting said leg to the base, the mounting structures securing the legs to the central base in the collapsed position of the transport condition and the expanded position of the deployed condition.

2. The apparatus of claim 1 wherein the collapsed position of a said leg is characterized by the leg extending substantially parallel to the central axis of the apparatus.

3. The apparatus of claim 2 wherein the expanded position of a said leg is characterized by the leg extending substantially perpendicular to the central axis of the apparatus.

4. The apparatus of claim 3 wherein the plurality of legs radiate outwardly with respect to the central axis in the expanded position.

5. The apparatus of claim 3 wherein the support apparatus has a width measurement measured in a direction perpendicular to the central axis, the transport condition of the apparatus being characterized by having a width measurement smaller than a width measurement of the apparatus in the deployed condition.

6. The apparatus of claim 1 wherein the plurality of mounting structures are configured on the central base to support the legs in substantially perpendicular orientations in a horizontal plane when the legs are in the expanded positions.

7. The apparatus of claim 1 wherein the plurality of mounting structures is configured to support the legs in the expanded position along axes that deviate from a perpendicular orientation to the central axis.

8. The apparatus of claim 1 wherein each of the mounting structures defines a channel for receiving a portion of a respective said leg.

9. The apparatus of claim 8 wherein the channel receives an inboard end portion of a respective said leg in the expanded position of the leg and in the collapsed position of the leg.

10. The apparatus of claim 8 wherein the channel of a said mounting structure has an open outer end away from the central axis and an open upper slot extending from the open outer end toward the central axis, the respective said leg extending through the open outer end of the channel when the leg is in the expanded position and extending through the open upper slot when the leg is in the collapsed position.

11. The apparatus of claim 1 wherein the inboard end of each leg is pivotally mounted on a respective said mounting structure of the base such that the leg pivots between the collapsed and expanded positions.

12. The apparatus of claim 1 wherein each mounting structure is configured to releasably secure a respective said leg in the collapsed position.

13. The apparatus of claim 12 wherein each mounting structure is configured to releasably secure a respective said leg in the expanded position.

14. The apparatus of claim 1 additionally comprising a towing component mounted on one of the legs, the towing component being located toward the outboard end of the leg.

15. The apparatus of claim 14 wherein the towing component is movably mounted on the leg, the towing component being movable between an extended position and a retracted position.

16. The apparatus of claim 15 wherein the towing component is rotatably mounted on the leg such that the towing component rotates between the extended and retracted positions.

17. The apparatus of claim 15 wherein the towing component comprises a towing plate and a detent mounted on the towing plate, the detent being alignable with a first indentation in the leg when the leg is in the extended position and alignable with a second indentation in the leg when the leg is in the retracted position.

18. The apparatus of claim 1 wherein the central base includes a plurality of mounting structures with a said mounting structure being associated with a said leg of the plurality of the legs for mounting said leg to the central base;
   wherein each of the mounting structures is configured to releasably secure a corresponding leg in the expanded position, each of the mounting structures including:
      a channel configured to receive an inboard end portion of the corresponding leg in the expended position of the corresponding leg; and
      a securing pin removably inserted into a securing aperture in the leg and into a securing hole in the channel to secure the leg in the expanded position.

19. A system for facilitating application of a substance to a surface of a body of a livestock animal, the system comprising:
   a substance receptive element configured to be moistened by the substance and configured to transfer a quantity of the substance to the surface of the body of the livestock animal when the surface comes into contact with the receptive element, the receptive element being elongate with opposite ends; and
   a support apparatus supporting the substance receptive element, the opposite ends of the receptive element being removably secured to the support apparatus at spaced locations on the apparatus, the support apparatus having a central axis extending between a top and a bottom of the apparatus, the support apparatus comprising:
      a central base toward the bottom of the apparatus;
      an upstanding stanchion mounted on the central base and being elongated along the central axis to extend toward the top of the apparatus; and
      a plurality of legs mounted on the base, each leg being elongated with an inboard end and an outboard end;
   wherein each of the legs is movable between a collapsed position with respect to the central base and an expanded position with respect to the central base, the collapsed position corresponding to a transport condition of the support apparatus and the expanded position corresponding to a deployed condition of the support apparatus; and
   wherein the central base includes a plurality of mounting structures with a said mounting structure being associated with each of the legs for mounting said leg to the base, the mounting structures securing the legs to the central base in the collapsed position of the transport condition and the expanded position of the deployed condition.

20. A support apparatus for supporting a substance receptive element to transfer a substance to a surface of a body of the livestock animal, the support apparatus having a central axis extending between a top and a bottom of the apparatus, the apparatus comprising:
   a central base toward the bottom of the apparatus;
   an upstanding stanchion mounted on the central base and being elongated along the central axis to extend toward the top of the apparatus; and
   a plurality of legs mounted on the base, each leg being elongated with an inboard end mounted on the central base and an outboard end for resting on a ground surface;
   wherein each of the legs is movable between a collapsed position with respect to the central base and an expanded position with respect to the central base, the collapsed position corresponding to a transport condition of the support apparatus and the expanded position corresponding to a deployed condition of the support apparatus; and
   wherein the central base includes a plurality of mounting structures with a said mounting structure being associated with a said leg of the plurality of the legs for mounting said leg to the central base;
   wherein each mounting structure of the plurality of mounting structures is configured to releasably secure the associated leg in the expanded position characterized by the leg extending along an axis which forms an obtuse angle with the stanchion to raise the central base off of the ground surface on which the outboard end of the leg is rested, each of the mounting structures including:
      a channel configured to receive an inboard end portion of the corresponding leg in the expended position of the associated leg;
      a securing pin removably inserted into a securing aperture in the leg and into a securing hole in the channel to secure the associated leg in the expanded position.

* * * * *